United States Patent
Butts et al.

(10) Patent No.: US 7,147,671 B2
(45) Date of Patent: Dec. 12, 2006

(54) SILICONE BASED FLAME RETARDANT SYSTEMS FOR TEXTILES

(75) Inventors: Matthew David Butts, Rexford, NY (US); Kathryn Ann Shaffer, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/449,893

(22) Filed: Jun. 2, 2003

(65) Prior Publication Data

US 2004/0242768 A1    Dec. 2, 2004

(51) Int. Cl.
*D06M 15/643*    (2006.01)

(52) U.S. Cl. .................. 8/196; 8/115.64; 8/128.3; 8/DIG. 1; 528/38; 252/8.61; 252/608; 106/287.11

(58) Field of Classification Search ............... 525/474, 525/475, 478; 524/174; 252/8.86, 607, 252/608, 8.61; 106/287.11, 287.14; 8/196, 8/115.64, DIG. 1, 128.3; 528/38
See application file for complete search history.

(56) References Cited

U.S. PATENT DOCUMENTS

| | | | | |
|---|---|---|---|---|
| 2,236,074 A | * | 3/1941 | Schwartz | 427/394 |
| 3,355,424 A | * | 11/1967 | Brown | 528/33 |
| 3,504,998 A | * | 4/1970 | Speier | 8/581 |
| 3,512,915 A | * | 5/1970 | Speier | 8/523 |
| 4,476,188 A | * | 10/1984 | Blizzard et al. | 428/332 |
| 4,652,618 A | | 3/1987 | Sumida et al. | |
| 4,705,704 A | | 11/1987 | Lane et al. | |
| 4,757,121 A | * | 7/1988 | Tanaka et al. | 252/8.63 |
| 4,888,136 A | * | 12/1989 | Chellapa et al. | 252/607 |
| 4,891,398 A | | 1/1990 | Tanaka et al. | |
| 4,978,561 A | * | 12/1990 | Cray et al. | 427/387 |
| 5,232,611 A | | 8/1993 | Ohashi et al. | |
| 5,883,185 A | | 3/1999 | Matsumura et al. | |
| 6,582,620 B1 | * | 6/2003 | Miyadai et al. | 252/8.62 |

FOREIGN PATENT DOCUMENTS

| | | |
|---|---|---|
| EP | 0 699 717 | 3/1996 |
| EP | 0 702 106 | 3/1996 |
| EP | 0936259 | 2/1999 |
| GB | 1 215 328 | 12/1970 |

OTHER PUBLICATIONS

Aluminum Lactate structure, obtained from ChemFinder.com.*
Gelest, Inc., Material Safety Data Sheet, *Aminopropylsilsesquioxane-Methylsilsequioxane-Copolymer Oligomer*, 22-25%—WSA-7011, pp. 1-3, 2002.
PCT Search Report—Nov. 24, 2004.

* cited by examiner

*Primary Examiner*—Margaret G. Moore
(74) *Attorney, Agent, or Firm*—Shawn A. McClintic; William E. Powell, III

(57) ABSTRACT

A silicone composition is provided which comprises at least one polysiloxane or siloxane oligomer functionalized with at least one amino group and at least three functional groups capable of cross-linking wherein the polysiloxane or siloxane oligomer imparts flame retardancy on a cellulose-containing substrate. Further embodiments of the present invention include a method for making and a cellulose-substrate comprising the aforementioned silicone composition.

22 Claims, No Drawings

SILICONE BASED FLAME RETARDANT SYSTEMS FOR TEXTILES

BACKGROUND OF THE INVENTION

The present invention relates to compositions for textile applications. More particularly, the present invention relates to silicone compositions which adhere durably to textiles and provide flame retardancy.

Textiles used in the clothing industry must adhere to certain standards before they can be sold. According to government regulations, clothing garments must exhibit a certain level of flame retardancy. Flame retardancy can be achieved by blending fabrics with flame retardant textiles. For example, in many cases cotton is blended with polyester to achieve required levels of flame retardancy. Unfortunately, blending fabrics with flame retardant textiles can have a negative effect on properties of the final textile such as softness. In cases where softness is an issue, flame retardancy can be imparted via treatment with a flame retardant material. For instance, treatment of textiles with phosphorus-based molecules or polycarboxylates that react durable with the fabric can result in flame retardancy of the fabrics. Unfortunately, these treatments often cause an unacceptable loss of fabric strength or require specialized processing equipment.

It is therefore desirable to produce flame retardant treatments which can be used to treat textiles and provide textile benefits that are appreciated by consumers as well as exhibit durability. Thus, new treatments are constantly being sought which meet these requirements.

BRIEF SUMMARY OF THE INVENTION

The present invention provides a silicone composition comprising at least one polysiloxane or siloxane oligomer functionalized with at least one amino group and at least three functional groups capable of cross-linking wherein the polysiloxane or silicone oligomer imparts flame retardancy on a cellulose-containing substrate.

In another embodiment, the present invention provides a method of treating a cellulose-containing substrate comprising (a) wetting the cellulose-containing substrate with an aqueous solution, dispersion, or emulsion of a silicone composition comprising at least one polysiloxane or siloxane oligomer functionalized with an amino group and at least three functional groups capable of cross-linking; and (b) curing the wetted cellulose-containing substrate at a temperature in a range between about 125° C. and about 220° C.

In yet a further embodiment, the present invention provides a cellulose-containing substrate comprising at least one polysiloxane or siloxane oligomer functionalized with at least one amino group and at least three functional groups capable of cross-linking.

DETAILED DESCRIPTION OF THE INVENTION

The present invention includes a silicone composition which includes at least one polysiloxane or siloxane oligomer functionalized with an amine containing group (hereinafter also referred to as "amino group") and at least three functional groups capable of functioning as cross-linking sites (hereinafter also referred to as "cross-linking precursor"). The polysiloxane of the present invention imparts flame retardancy to natural fiber/cellulose substrates or substrates containing natural fibers/cellulose.

The present invention includes at least one polysiloxane or siloxane oligomer having the formula:

$$M_a M'_b D_c D'_d T_e T'_f Q_g$$

where the subscripts a, b, c, d, e, f and g are zero or a positive integer, subject to the limitation that the sum of the subscripts b, d and f is at least two with the proviso that b is at least 4 if d and f are 0; where M has the formula:

$$R^1{}_3 SiO_{1/2},$$

M' has the formula:

$$(X)_h R^2{}_{3-h} SiO_{1/2},$$

D has the formula:

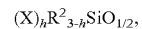

$$R^3{}_2 SiO_{2/2},$$

D' has the formula:

$$(X)_{(2-i)} R^4{}_i SiO_{2/2},$$

T has the formula:

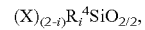

$$R^5 SiO_{3/2},$$

T' has the formula:

$$(X) SiO_{3/2},$$

and Q has the formula $SiO_{4/2}$, where subscript h is in a range between 1 and 3; subscript i is 0 or 1; each $R^1$, $R^2$, $R^3$, $R^4$, $R^5$ is independently at each occurrence a cross-linking precursor, hydrogen atom, $C_{1-30}$ alkyl, $C_{1-22}$ alkoxy, $C_{2-22}$ alkenyl, $C_{6-14}$ aryl, and $C_{6-22}$ alkyl-substituted aryl, and $C_{6-22}$ aralkyl, any of which groups may be halogenated, for example, fluorinated to contain fluorocarbons such as $C_{1-22}$ fluoroalkyl, or may contain polyether units of the formula $(CH_2 CHR^6 O)_k$ where $R^6$ is independently in each repeat unit $CH_3$ or H and "k" is in a range between about 4 and about 50; X, independently at each occurrence, represents an amino group or a cross-linking precursor with the proviso that the polysiloxane or siloxane oligomer has at least three cross-linking precursors per molecule and at least one amino group. The amino group typically is in the form of $C_{1-30}$ aminoalkyls. The amino group can contain primary nitrogen groups, secondary nitrogen groups, tertiary nitrogen groups, quaternary nitrogen groups, or any mixture thereof. It may or may not be part of an aliphatic ring structure. It may also consist of or be interrupted by aromatic rings. The amino group may contain any number of nitrogen atoms, preferably 1 or 2. Preferred amino groups are aminopropyl and aminoethylaminopropyl. The term "alkyl", as used in various embodiments of the present invention, is intended to designate both normal alkyl, branched alkyl, aralkyl, and cycloalkyl radicals. Normal and branched alkyl radicals are preferably those containing in a range between about 1 and about 30 carbon atoms, and include as illustrative non-limiting examples methyl, ethyl, propyl, isopropyl, butyl, tertiary-butyl, pentyl, neopentyl, hexyl, dodecyl, cetyl, and stearyl. Cycloalkyl radicals represented are preferably those containing between about 4 and about 12 ring carbon atoms. Some illustrative non-limiting examples of these cycloalkyl radicals include cyclobutyl, cyclopentyl, cyclohexyl, methylcyclohexyl, and cycloheptyl. Preferred aralkyl radicals are those containing between about 7 and about 14 carbon atoms. These include, but are not limited to, benzyl, phenylbutyl, phenylpropyl, and phenylethyl. Aryl radicals used in the various embodiments of the present invention are preferably those containing between about 6 and about 20 ring carbon atoms and contain at least one monocyclic or polycyclic moiety wherein a polycyclic may comprise fused or linked rings. Some illustrative non-limiting examples of these aryl radicals include phenyl, biphenyl, and naphthyl. An illustrative non-limiting example of a suitable halogenated moiety is trifluoropropyl.

According to the present invention, "cross-linking precursor" as used herein includes any moiety that is capable of providing cross-linking either directly (e.g. hydroxy groups) or indirectly (e.g. alkoxy groups) with other amino functionalized polysiloxanes or siloxane oligomers of the present invention or with added cross-linking compounds containing at least two cross-linking precursors. Typical cross-linking precursors include hydroxy groups, alkoxy groups, hydrogen, and electrophilic groups combined with nucleophilic groups. Most typically, the cross-linking precursor is a hydroxy group.

The number of amino groups on the polysiloxane or siloxane oligomer in the present invention that is capable of imparting flame retardancy to cellulose-containing substrates is at least one, however, all the silicon atoms of the polysiloxane or siloxane oligomer may be substituted with amino groups. In preferred embodiments of the present invention, the average ratio of Si atoms substituted with amino groups to those that are not is in a range between about 1 and about 5. Preferably, the polysiloxane or siloxane oligomer is water soluble or capable of being emulsified.

The polysiloxanes or siloxane oligomers of the present invention are typically prepared by equilibration reactions containing silanes or oligosilanes substituted with amino groups and cross-linking precursors in the presence of a suitable catalyst, subject to the structural parameters described above. The catalyst is preferably a basic catalyst.

In one embodiment of the present invention, a silicone composition includes a preponderance of specific linear, branched, cross-linked, or cyclic polysiloxanes. Also, suitable compositions may comprise one or more polysiloxanes or siloxane oligomers which may contain adventitious amounts of other species at a level in a range between about 0.0001 wt % and about 5 wt % based on total silicon-containing species, for example, arising during the synthesis process for said polysiloxanes or siloxane oligomers. In illustrative examples, suitable compositions may contain adventitious amounts of $D_4$, or species containing Si—H, Si—OH, Si—O-alkyl bonds, and mixtures thereof that do not contain amino groups.

The silicone fabric treatment composition of the present invention may also optionally include additives such as a catalyst or mixture of catalysts; cross-linking agents; organic compounds; inorganic compounds that contain species such as phosphorus, boron, aluminum, magnesium, or zinc; or combinations thereof with the proviso that the additive or group of additives do not have a negative effect on the flame retardant benefits of the silicone composition. In preferred embodiments of the present invention, the silicone composition may include at least one aluminum compound, such as aluminum lactate. When present, the aluminum compound is present in a range between about 0.01% and about 10% by weight based on the silicone composition, and more preferably, in a range between about 0.5% and about 5% by weight based on the silicone composition.

Catalysts that accelerate curing of the silicone composition on the fabric may also be present. Typically, the catalyst is present in a range between about 0.0001 weight % and about 10 weight % with respect to silicon in the composition, and preferably, in a range between about 0.001 weight % and about 5 weight % with respect to the total composition. Examples of cure catalysts include, but are not limited to, organic or inorganic acids and bases.

Silicone compositions of the present invention that include at least one polysiloxane or siloxane oligomer functionalized with at least one amino group and at least three functional groups capable of cross-linking typically impart flame retardant benefits to materials such as textiles, including cellulose-containing surfaces such as natural fibers and regenerated fibers including blends. A particular advantage of the present invention is that the described functional groups enable the silicone composition to adhere durably to a cellulose-containing surface.

The silicone composition can be applied to the substrate by any method known to those skilled in the art. For example, padding processes are typical for textile treatment. Usually, in the padding process the substrate is wetted with an aqueous solution, non-aqueous solution, dispersion, or emulsion of the silicone composition. For example, the silicone composition can be delivered in a water mixture which can contain the silicone composition in a range between about 0.01% by weight and about 99% by weight based on the total mixture. After application of the silicone composition to the substrate, the composition can be cured over a period in a range between about 5 minutes and about 2 hours, and preferably over a period in a range between about 5 minutes and 30 minutes. Typically, the cure temperature is in a range between about 125° C. and about 220° C., preferably in a range between about 150° C. and about 200° C. Alternatively, the substituted silicone or silicone resin can be applied to the substrate neat and cured in the same manner.

In order that those skilled in the art will be better able to practice the present invention, the following examples are given by way of illustration and not by way of limitation.

EXAMPLES

Representative Fabric Treatment

A 2 inch×6 inch piece of 100% cotton fleece was shaken with an aqueous solution containing 5% by weight a siloxane oligomer (aminoethylaminopropyl silsesquioxane oligomer, Gelest, Inc., referred to as "siloxane" in Table 1) and aluminum lactate (0.9% or 3.7% by weight based on the total weight of the fabric treatment composition) at room temperature. The fabric was removed and run through a hand-turned clothes wringer. The wet pick up was determined to be approximately 100%. This was repeated on a total of 14 fleece samples. The samples were heated in a convection oven at 150° C. for 20 minutes and then allowed to cool to room temperature. Five samples were evaluated for flame retardancy performance after treatment/heating, and five others were washed prior to flame testing.

Fabric Washing

In a one gallon metal paint can was mixed 3.9 grams of 1993 AATCC laundry detergent and 1.5 kg of tap water. The can was placed on a stirrer/hot plate and fitted with an overhead mechanical stirrer with a 3-bladed impeller positioned just below the surface of the water. A metal thermocouple was inserted at a 45° angle to the water. Seven pieces of treated fabric (all from the same treatment) were added.

With the stirrer set at 60–70%, the samples were washed for 12 min at 49° C. The fabric samples were then removed and placed in a beaker under a flow of cold tap water (~15° C.) for 5 min to rinse. The excess water was removed, and the samples were dried horizontally on a rack overnight at room temperature.

Flame Testing

Prior to testing, all fabric pieces were conditioned in a convection oven at 105° C. for 30 min. The samples were individually placed in sample holders and kept in a desiccator for 1–3 hours. The samples were then flame tested according to the standard protocol for the 45° 16CFR1610 test. The flame tester used was manufactured by the Govmark Organization, Inc. (Bellmore, N.Y.).

TABLE 1

Flame tested data of treated and untreated 100% cotton fleece.

| | Initial flame retardancy | | | | Flame retardancy after washing | | | |
|---|---|---|---|---|---|---|---|---|
| Treatment | BB[1] | threads burnt | burn time (sec) | FR class[2] | BB[1] | threads burnt | burn time (sec) | FR class[2] |
| none[3] | 5/5 | 5/5 | 1 | 3 | 5/5 | 5/5 | 8 | 2 |
| 5% siloxane + 3.7% aluminum lactate | 0/5 | 0/5 | n/a | 1 | 0/5 | 2/5 | 3 | 1 |
| 5% siloxane + 0.9% aluminum lactate | 0/5 | 0/5 | n/a | 1 | 0/5 | 0/5 | n/a | 1 |
| 5% siloxane + 0.9% colloidal alumina | 0/5 | 0/5 | n/a | 1 | 0/5 | 2/5 | 3 | 1 |

[1]Number of samples exhibiting base burns, out of 5 samples tested.
[2]Flame retardancy class assignment per the 16CRF1610 test.
[3]All untreated fabrics were completely consumed in the flame test, before and after washing. None of the treated samples were completely consumed.

The data in Table 1 clearly shows that cotton fleece treated with the siloxane compound mixture exhibited flame retardancy both before and after washing.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. A textile treating composition, comprising:
   aluminum lactate; and
   a branched polysilaxane or a branched siloxane oligomer comprising:
     at least one amino group, and
     at least three cross-linking groups, and
     wherein the branched polysiloxane or the branched siloxane oligomer has the formula:

$M_a M'_b D_c D'_d T_e T'_f Q_g$ wherein the subscripts a, b, c, d, e, f and g are zero or a positive integer, subject to the limitations that each of the subscripts b, d and f are positive integers, and the sum of the subscripts b, d and f is at least 4,
   and wherein
   M has the formula:

$R^1_3 SiO_{1/2}$,

M' has the formula:

$(X)_h R^2_{3-h} SiO_{1/2}$,

D has the formula:

$R^3_2 SiO_{2/2}$,

D' has the formula:

$(X)_{(2-i)} R^4_i SiO_{2/2}$,

T has the formula:

$R^5 SiO_{3/2}$,

T' has the formula:

$(X) SiO_{3/2}$, and Q has the formula $SiO_{4/2}$, wherein the subscript h is an integer from 1 to 3 inclusive; the subscript i is 0 or 1; each $R^1, R^2, R^3, R^4, R^5$ is independently at each occurrence one of the at least three cross-linking groups, hydrogen, $C_{1-30}$ alkyl, $C_{1-22}$ alkoxy, $C_{2-22}$ alkenyl, $C_{5-14}$ aryl, $C_{6-22}$ alkyl-substituted aryl, $C_{6-22}$ aralkyl, or $C_{1-22}$ polyether; and each X is independently at each occurrence one of the at least one amino group or the at least three cross-linking groups,
   wherein the textile treating composition imparts flame retardancy to a textile when adhered to the textile, and
   wherein the branched polysiloxane or the branched siloxane oligomer is present relative to the aluminum lactate in a weight ratio of 5:3.7.

2. The composition as defined in claim 1, wherein the cross-linking groups comprise one or more of hydroxyl, alkoxy groups, or hydrogen.

3. The composition as defined in claim 1, wherein the amino group is an aminopropyl group.

4. The composition as defined in claim 3, wherein the branched polysiloxane or the branched siloxane oligomer is an aminoethylaminopropyl silsesquioxane oligomer.

5. The composition as defined in claim 1, wherein the polysiloxane has average ratio of silicon atoms substituted with amino groups to those that are not substituted such that the ratio is in a range of from about 1 to about 5.

6. The composition as defined in claim 1, further comprising an additive comprising one or more of phosphorus, boron, aluminum, magnesium, or zinc; with the proviso that the additive, or group of additives, does not have a negative effect on the flame retardant benefits of the composition.

7. The composition as defined in claim 1, further comprising a basic catalyst.

8. A textile comprising a fiber substrate and the composition as defined in claim 1 adhered to the fiber substrate.

9. The textile as defined in claim 8, wherein the textile, when flame tested according to standard protocol for 45° 16CFR1610 test, has a flame retardaney class assignment of 1.

10. The textile as defined in claim 8, wherein the fiber substrate is natural fiber.

11. The textile as defined in claim 8, wherein the fiber substrate is cellulose.

12. A composition, comprising:
aluminum lactate; and
a branched polysiloxane or a branched sioxane oligomer comprising:
  at least one amino group, and
  at least three cross-linking groups, and
  wherein the branched polysiloxane or the branched siloxane oligomer has the formula:

$M_a M'_b D_c D'_d T_e T'_f Q_g$ wherein the subscripts a, b, c, d, e, f and g are zero or a positive integer, subject to the limitations that each of the subscripts b, d and f are positive integers, and the sum of the subscripts b, d and f is at least 4, and wherein M has the formula:

$R^1_3 SiO_{1/2}$,

M' has the formula:

$(X)_h R^2_{3-h} SiO_{1/2}$,

D has the formula:

$R^3_2 SiO_{2/2}$,

D' has the formula:

$(X)_{(2-i)} R^4_i SiO_{2/2}$,

T has the formula:

$R^5 SiO_{3/2}$,

T' has the formula:

$(X)SiO_{3/2}$, and Q has the formula $SiO_{4/2}$, wherein the subscript h is an integer from 1 to 3 inclusive; the subscript i is 0 or 1; each $R^1$, $R^2$, $R^3$, $R^4$, $R^5$ is independently at each occurrence one of the at least three cross-linking groups, hydrogen, $C_{1-30}$ alkyl, $C_{1-22}$ alkoxy, $C_{2-22}$ alkenyl, $C_{6-14}$ aryl, $C_{6-22}$ alkyl-substituted aryl, $C_{6-22}$ aralkyl, or $C_{1-22}$ polyether; and each X is independently at each occurrence one of the at least one amino group or the at least three cross-linking groups, wherein the textile treating composition imparts flame retardancy to a textile when adhered to the textile, and wherein the branched polysiloxane or branched siloxane oligomer is present relative to the aluminum lactate in a weight ratio of 5:0.9.

13. The composition as defined in claim 12, wherein the cross-linking groups comprise one or more of hydroxyl, alkoxy groups, or hydrogen.

14. The composition as defined in claim 12, wherein the amino group is an aminopropyl group.

15. The composition as defined in claim 14, wherein the branched polysiloxane or the branched siloxane oligomer is an aminoethylaminopropyl silsesquioxane oligomer.

16. The composition as defined in claim 12, wherein the polysiloxane has average ratio of silicon atoms substituted with amino groups to those that are not substituted such that the ratio is in a range of from about 1 to about 5.

17. The composition as defined in claim 12, further comprising an additive comprising one or more of phosphorus, boron, aluminum, magnesium, or zinc; with the proviso that the additive, or group of additives, does not have a negative effect on the flame retardant benefits of the composition.

18. The composition as defined in claim 12, further comprising a basic catalyst.

19. A textile comprising a fiber substrate and the composition as defined in claim 12 adhered to the fiber substrate.

20. The textile as defined in claim 19, wherein the textile, when flame tested according to standard protocol for 45° 16CFR1610test, has a flame retardancy class assignment of 1.

21. The textile as defined in claim 19, wherein the fiber substrate is natural fiber.

22. The textile as defined in claim 19, wherein the fiber substrate is cellulose.

* * * * *